(12) United States Patent
Rueckel

(10) Patent No.: US 8,162,579 B2
(45) Date of Patent: Apr. 24, 2012

(54) UNDETACHABLE PLASTIC ANCHOR

(75) Inventor: Thomas Rueckel, Aub (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 419 days.

(21) Appl. No.: 12/593,093

(22) PCT Filed: Mar. 11, 2008

(86) PCT No.: PCT/IB2008/000565
§ 371 (c)(1),
(2), (4) Date: Sep. 25, 2009

(87) PCT Pub. No.: WO2008/120055
PCT Pub. Date: Oct. 9, 2008

(65) Prior Publication Data
US 2010/0111638 A1    May 6, 2010

(30) Foreign Application Priority Data

Mar. 29, 2007   (DE) .......................... 10 2007 015 129

(51) Int. Cl.
*F16B 37/04* (2006.01)
(52) U.S. Cl. ............ 411/182; 411/112; 411/509; 24/453
(58) Field of Classification Search .................. 411/112, 411/172–175, 182, 183, 508–510, 913; 24/289–297, 24/453
See application file for complete search history.

(56) References Cited

U.S. PATENT DOCUMENTS

| 4,595,325 | A | | 6/1986 | Moran et al. | |
|---|---|---|---|---|---|
| 4,606,688 | A | * | 8/1986 | Moran et al. | 411/175 |
| 4,704,059 | A | * | 11/1987 | Nakama et al. | 411/182 |
| 4,787,795 | A | * | 11/1988 | Kraus | 411/510 |
| 4,925,351 | A | * | 5/1990 | Fisher | 411/182 |
| 5,092,550 | A | * | 3/1992 | Bettini | 248/188.4 |
| 5,829,934 | A | * | 11/1998 | Danby et al. | 411/182 |
| 5,873,690 | A | * | 2/1999 | Danby et al. | 411/55 |
| 5,919,019 | A | * | 7/1999 | Fischer | 411/182 |
| 6,095,734 | A | | 8/2000 | Postadan et al. | |
| 2006/0034671 | A1 | * | 2/2006 | Castro et al. | 411/437 |

FOREIGN PATENT DOCUMENTS

| CA | 957601 | | 11/1974 |
|---|---|---|---|
| EP | 176267 | A1 | 4/1986 |
| EP | 1650447 | A1 | 4/2006 |
| FR | 2160192 | A5 | 6/1973 |
| GB | 887816 | A | 1/1962 |

OTHER PUBLICATIONS

ISR for PCT/IB2008/000565 mailed Feb. 23, 2009.

* cited by examiner

*Primary Examiner* — Victor Batson
*Assistant Examiner* — Roberta Delisle
(74) *Attorney, Agent, or Firm* — Lowe Hauptman Ham & Berner LLP

(57) ABSTRACT

A plastic, undetachable anchor (10) to affix a component (52) to a support (54), comprising a rectangular affixing aperture (56), the anchor comprising a resilient, flange-like head (12), a hollow shank (16) subtending an axis and connected at one end to the head (12) and receiving an affixation screw (20), further resilient detent arms (40,42) connected to the shank end away from the head (14), where the detent arms (40,42) running obliquely outward toward the head (14) are fitted at their free ends with a detent shoulder (44) engaging {in the assembled state—an edge of an affixation aperture (56) facing them in order to secure the anchor (10) against being pulled out of the affixation aperture (56).

9 Claims, 2 Drawing Sheets

UNDETACHABLE PLASTIC ANCHOR

RELATED APPLICATIONS

The present application is based on, and claims priority from, German Application Number 10 2007 015 129.4, filed Mar. 29, 2007, the disclosure of which is hereby incorporated by reference herein in its entirety.

The present invention relates to an undetachable plastic anchor.

Various plastic or metallic anchors are used in automotive engineering to affix components to their supports. In general metal anchors are able to withstand larger forces than plastic anchors. On the other hand, plastic anchors are more economical. Moreover more complex shapes can be manufactured using plastics.

Typically a plastic anchor comprises a resilient head connected to a shank. At its end away from the head, the shank is fitted with detent arms running obliquely toward the head and having a shoulder surface cooperating with one edge of an affixation aperture. If following assembly a tension is applied to the anchor, the detent arm prevents anchor extraction/pullout.

Furthermore anchors are known which are fitted with a hollow shank receiving an affixation screw. This design allows connecting a plurality of anchors by means of affixation screws to a component of substantial area which thereafter can be affixed by said anchors to a support.

In a variety of applications, a requirement arises that the force which would be required to pull such anchors out of their apertures shall be very high. With such anchors, the force that must be applied in assembly is also very high.

The objective of the present invention is to create an undetachable plastic anchor for affixing a component to a support and offering both low forces of assembly and high pullout strength. This plastic anchor shall offer pullout strengths comparable to those of metal anchors.

In the design of the present invention, certain elements are connected to the detent arms running obliquely toward the closed shank end. A rest surface is subtended at the shank's outside and cooperates with an arm element. In the relaxed anchor condition, the free end of the arm element is situated comparatively close to the rest surface. When a pullout force is exerted on the anchor, the free end of the arm element will abut the rest surface and thereby will preclude anchor pullout. Accordingly, in the anchor of the present invention, two different parts oppose such pullouts, namely the detent arms and the arm elements abutting the rest surface which also present high pullout resistance.

The anchor of the present invention can only be removed destructively from the affixation aperture. At the same time the required anchor assembly force is small.

Also the anchor of the present invention can be manufactured economically and can be used in many different applications.

In one embodiment mode of the present invention, two diametrically opposite first bracing ribs are connected to the shank, each facing a slot of the detent arms. Said ribs extend into the slot after the anchor has been assembled into the aperture. When in the assembled state, the detent arms are slightly bent toward the shank. In this condition the ribs are situated are situated at least partly within the slot constituted in the detent arms. Preferably one arm element shall be integrated on each side of a detent arm slot.

In another embodiment mode of the present invention, the rest surface is slightly oblique and runs outward toward the head. This design precludes the arm element's free end from slipping off the rest surface and thereby losing its retention.

In a further embodiment mode of the present invention, second bracing ribs may be integrated into the shank and be configured at an offset of about 90° from the first bracing ribs. The first and second bracing ribs constitute a lateral boundary within the affixation aperture, as a result of which the anchor's lateral displaceability is limited. This feature prevents the anchor, when tipped sideways, from being pulled out of said aperture. Second, axially parallel rest surfaces are integrated into the second bracing ribs. A second rest surface precludes the detent arms from being bent in the direction of the shank and thereby the anchor is additionally secured against pullout.

In another embodiment mode of the present invention, the detent arms are joined by connection elements to the closed shank end and run approximately transversely to the shaft axis in outward manner. The connection elements are designed to be somewhat resilient.

An illustrative embodiment mode of the present invention is elucidated below in relation to the appended drawings.

Figure 1:
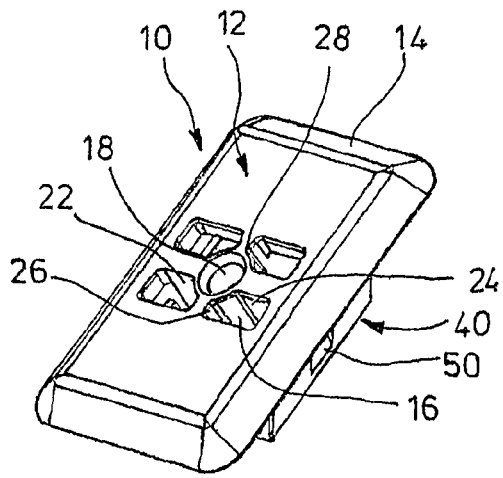
FIG. 1 is a perspective top view of an anchor of the invention.

FIGS. 1 through 8 show an affixation anchor 10 comprising a rectangular, flange-like head 12 and a beveled rim 14 imparting resiliency to the head.

A hollow shank 16 is configured at the head's underside and comprises a borehole 18 open at the outside of the head 12 to receive an affixation screw 20. The borehole 18 is closed at its lower end (FIG. 4).

First bracing ribs 22, 24 are externally connected to the outside of the shank 16 on diametrically opposite sides. Second bracing ribs 26, 28 are integrated also in diametrically opposite sides of the shank 16. These second bracing ribs 26, 28 are offset by 90° from the first bracing ribs 22, 24.

Figure 3:
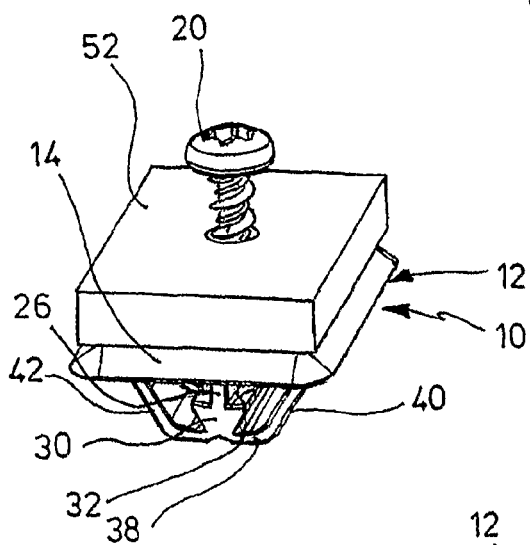
FIG. 3 shows the anchor of FIGS. 1 and 2 after being connected to a component.
Figure 4:
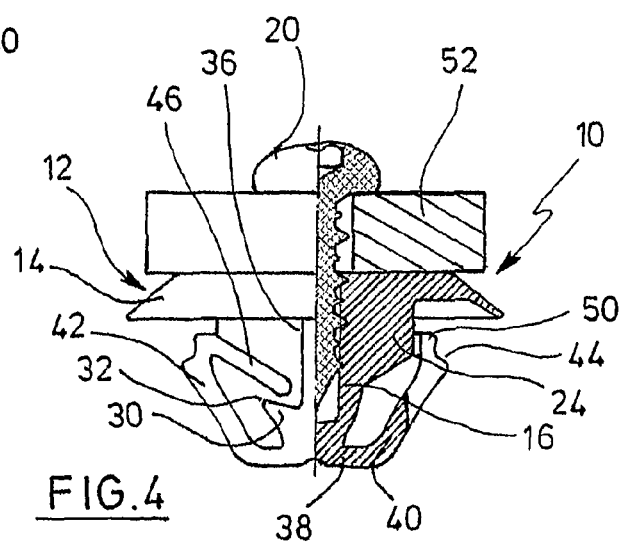
FIG. 4 is a view of FIG. 3 partly in section and partly in side view.
Figure 5:
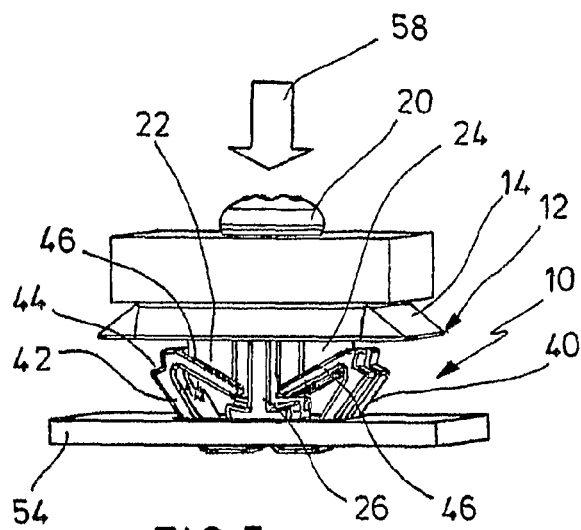
FIG. 5 is a partial perspective of the configuration of FIG. 3 during assembly.
Figure 6:
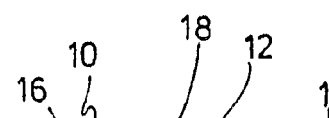
FIG. 6 is the configuration of FIG. 5 partly in section and partly in side view.

At their ends away from the head 12, the bracing ribs 26, 28 are fitted with a bilateral reinforcement as indicated in FIGS. 3 and 4. This reinforcement constitutes rest surfaces 32 on both sides of the ribs 26, 28. The rest surfaces 32 run approximately perpendicularly to the axis of the shank 16 through being slightly oblique relative to the head 12. Adjoining the rest surfaces 32, the ribs 26, 28 constitute further rest surfaces 36. Junction elements 38 are integrated at the lower shank end onto the reinforced part 30. These junction elements run approximately perpendicularly to the axis of the shank 16 and nearly parallel to the head 12 between the mutually opposite ends of the ribs 26, 28. Detent arms 40 respectively 42 are integrated into the junction elements 38. These detent arms run obliquely upward toward the head 12. As shown particularly clearly in FIG. 4, the detent arms 40, 42 are fitted with a detent shoulder 44 including part of the free ends of the detent arms 40, 42. An arm element 46 is integrated at the end of the detent arms 40, 42 into the shoulder 44 which runs obliquely downward toward the closed end of the shank 16. The free end of the arm elements 46 is situated in the relaxed, respectively assembled, state of the anchor 10 above and near the rest surfaces 32.

Figure 2:
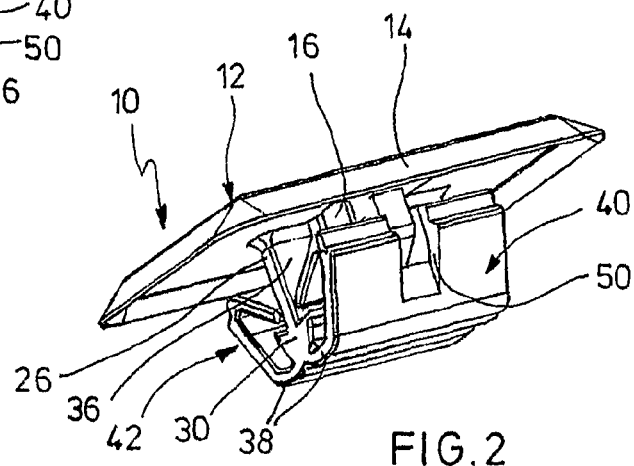
FIG. 2 shows the anchor in an oblique perspective from below.

As shown clearly in particular in FIG. 2, the detent arms 40, 42 are centrally divided by a slot 50. The bracing ribs 22, 24 are oriented relative to the slot 50. The width of the bracing ribs 22, 24 is somewhat less than the width of the slot 50.

Figure 7:
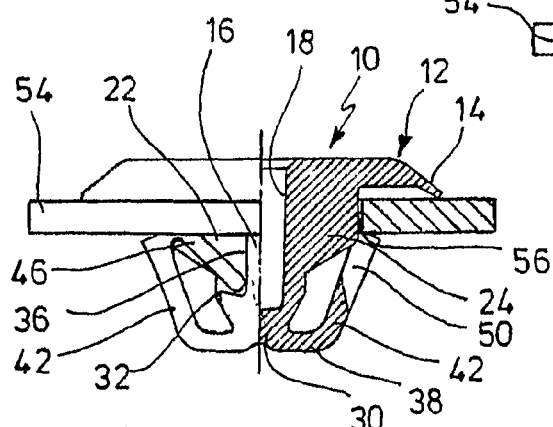
FIG. 7 shows the assembled state o the anchor of FIGS. 1 and 2 in a support, in side view and in section.
Figure 8:
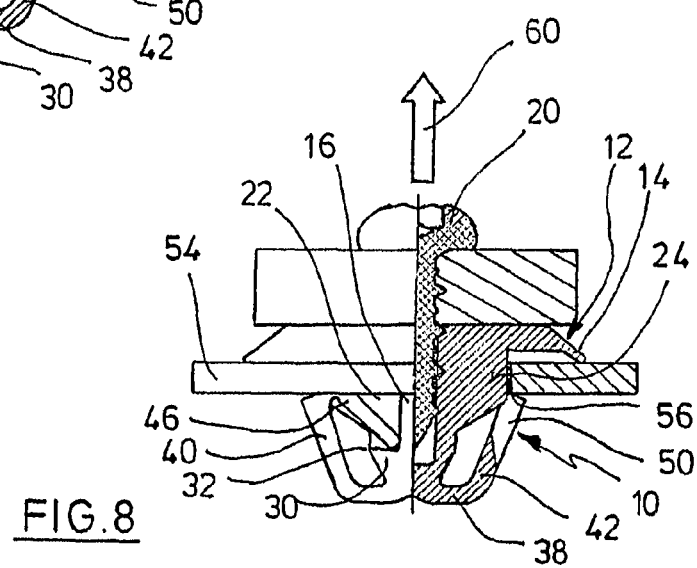
FIG. 8 shows the configuration of FIG. 7 following assembly of the anchor to a component.

As shown by FIGS. 3 and 4, a component 52 can be affixed against the top side of the head 12 by means of the affixation screw 20. As shown by FIGS. 5 through 8, this sub-assembly can be affixed to a support plate 54 fitted with a rectangular aperture 56. in FIG. 5 the anchor is forced into said aperture in the direction of the arrow 38, the detent arms 40, 42 being slightly deformed in the direction of the shank 16. In this process the ribs 22, 24 partly enter the slot 50 as shown in FIGS. 7 and 8. On account of the above insertion, the detent arms 40, 42 are deformed toward each other by the aperture 56 until the shoulder 54 grips the facing edge of the slot 50. In this way the anchor 10 is kept in locking manner in the aperture 56. When a pullout force is exerted in the direction of the arrow 60, anchor removal is inhibited by the shoulders 56. As shown by FIGS. 7 and 8, the bracing ribs 22, 24 respectively 26, 28 prevent the anchor 10 from moving parallel to the support sheetmetal 54.

In the course of the above described assembly, the free end of the arm elements 46 moves fairly closely to the rest shoulders 32 and the rest surfaces 36. If a pullout force is exerted on the anchor 10 as indicated by the arrow 60, the arm elements 46 will additionally lock said anchor. Any axial displacement as indicated by the arrow 60 toward the shank 16 entails that, by means of the rest surfaces 32, a force shall be channeled by the rest surfaces 32 into the arm elements 46 in the direction of the shoulders 44 of the detent arms 40, 42. This force is directed obliquely outward and reinforces the afore discussed anchor locking in the aperture 56.

It follows from the above disclosure of embodiment modes relating to FIGS. 1 through 8 that, short of destroying it, the anchor 10 cannot be removed from the affixation aperture.

The invention claimed is:

1. A plastic anchor to affix a component to a support, comprising a rectangular affixation aperture, a resilient, flange-like head, a hollow shank which subtends an axis and is connected at one end to the head to receive an affixation screw, further resilient detent arms connected to the closed shank end away from the head, the detent arms running obliquely outward toward the head and being fitted at their free ends with a detent shoulder that, in the assembled state, engages a facing edge of the affixation aperture in order to secure the anchor against being pulled out of said aperture, characterized
in that at least one arm element is connected to the side of the detent arms facing the shank, said arm element running obliquely inward toward the closed end of the shank, in that a rest surface is integrated into the outside of the shank and is configured near the free end of the arm element approximately transversely to the shank in a manner that the free end of the arm element cooperates with the rest surface when a pullout force is exerted on the assembled anchor.

2. Anchor as claimed in claim 1, characterized in that two diametrically opposite first bracing ribs are connected to the shank, each facing a slot of the detent arms and entering these slots when the detent shoulders grip/abut the aperture rim from below.

3. Anchor as claimed in claim 2, characterized in that an arm element is connected on each side of the slot to a detent arm.

4. Anchor as claimed in claim 1, characterized in that the rest surface is slightly oblique and runs outward toward the head.

5. Anchor as claimed in claim 1, characterized in that the rest surface is integrated into second bracing ribs which are diametrically opposite each other and connected to the other side of the shank.

6. Anchor as claimed in claim 5, characterized in that second rest surfaces are constituted at the second bracing ribs which abut the first rest surface and run approximately parallel to a plane passing through the axis of the shank.

7. Anchor as claimed in claim 1, characterized in that the bracing ribs also are connected to the head.

8. Anchor as claimed in claim 1, characterized in that the bracing ribs limit on all sides a lateral displacement of the anchor when this anchor is installed.

9. Anchor as claimed in claim 1, characterized in that the detent arms are connected by link elements to the closed end of the shank and run outward approximately transversely to the axis of the shank.

* * * * *